June 23, 1959 W. NEUMANN 2,891,279
PROCESS OF AND APPARATUS FOR THE MANUFACTURE OF PAPER-LIKE MATERIALS FROM THERMOPLASTIC SYNTHETIC MATERIALS
Filed July 17, 1952
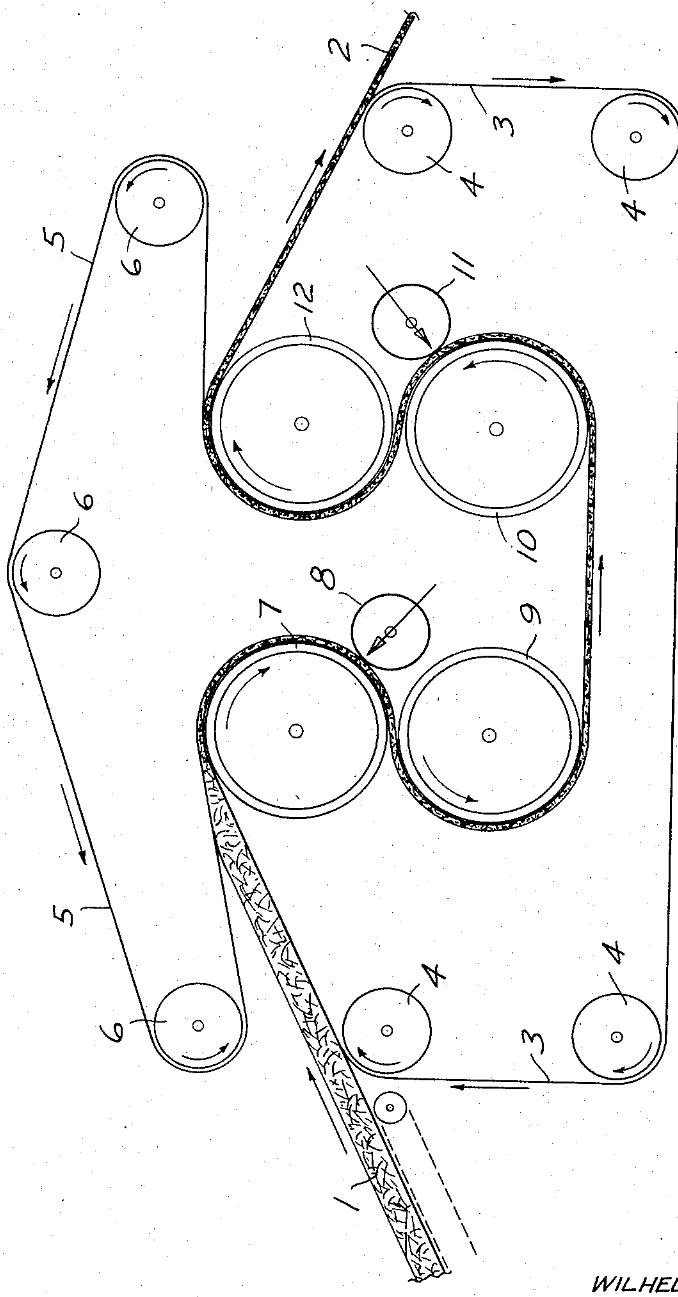
INVENTOR.
WILHELM NEUMANN
BY Andrew E. Haug
ATTORNEY United States Patent Office 2,891,279

Patented June 23, 1959

2,891,279

PROCESS OF AND APPARATUS FOR THE MANUFACTURE OF PAPER-LIKE MATERIALS FROM THERMOPLASTIC SYNTHETIC MATERIALS

Wilhelm Neumann, Stuttgart-Feuerbach, Germany, assignor to C. F. Roser G.m.b.H., Stuttgart-Feuerbach, Germany, a German limited-liability company Application July 17, 1952, Serial No. 299,382

9 Claims. (Cl. 18—10)

The invention relates to processes for the manufacture of paper-like materials, more especially in the form of comparatively thin flat layers, for example, sheets, webs or the like, starting from thermoplastic synthetic fibres, and to arrangements for carrying the process into effect, and to the product of the process itself.

According to the invention, fibres of thermoplastic synthetic materials which are in a loose web or fleece formation, or in felted form, are stuck by using pressure exerted only at individual and, preferably, uniformly distributed points or positions on the surface, the sticking occurring at the points of contact. The process is preferably effected under heat and without the use of adhesives. The amount of pressure, and the temperature or the duration of the heat treatment must not be such that the fibres run into one another to form a foil.

If in accordance with the proposal of the invention, a loose web in the form of a fleece is produced from thermoplastic synthetic fibres, which may for example have staple fibre lengths (it being possible for the fibres to be felted with one another) and if this web is treated with a pressure acting at separate points or positions, with which pressure (with or without use of elevated temperatures or other conditions) a softening of the thermoplastic material takes place in such manner that the fibres are stuck to one another at the points or places of contact, then if the pressure action or the other conditions are not carried to such an extent or selected such that fusion or coalescence of the fibres takes place to form a foil, there is obtained a product which can be used like paper but has the great advantage that, by starting with fibres of thermoplastic synthetic materials which are resistant to chemicals, a paper-like product is obtained which is resistant to moisture and also to acid or alkali liquids, but is permeable to gases and air.

In a preferred embodiment of the invention, heat is employed during the pressure treatment for the purpose of sticking the points of contact of the fibres, said heat making the said contact points of the fibres sticky; alternatively, the sticking may be assisted in other ways, for example, by the use of swelling agents.

It has previously been proposed in German patent specification No. 724,022 to provide filter sheets of fibres of polymerised hydrocarbons or derivatives thereof containing chlorine or mixed polymers thereof, in which the fibres are shaped in the dry or wet state, in the manner known for cellulose fibres, by using moderate heat under pressure. The aforesaid German specification also states that a carded fleece of polyvinyl chloride fibres can be pressed under moderate heat to form a permeable sheet which is still not closed, in such manner that the fibres soften gently under pressure and provide a cohesive pervious layer of fibres; the products formed in this manner are completely resistant to acids and alkalis and are suitable as filter sheets. Instead of this arrangement, it would also be possible to form a fibre pulp in a pulping machine and to produce a sheet from it in accordance with paper production methods; such a sheet is similar to the conventional cellulose filter papers and can be used in the same way as the latter after drying and compressing and being hot-calendered on both sides.

In actual fact, however, when using such a precedure, there is no certainty that coalescence producing a more or less impervious foil, can be avoided nor is it possible to adjust and determine the degree of permeability, or to produce a mechanically rigid but highly permeable product or a product of pre-determined permeability and pore size.

When proceeding in accordance with the present invention, on the contrary, the fibres are united to form a paper-like material at the points where the pressure is applied, while at the places at which no pressure is applied, the union of the fibres at the points of contact may perhaps be looser or non-existent. In this way, by choosing the spacing of the pressure points from one another, it is possible to produce a more or less dense paper-like product.

It has already been proposed in German patent specification No. 745,498 to manufacture filter elements (for example, plates or tubes) from synthetic fibres by cold compression to form the element, and then to subject this element to a pressure exerted in strip form under heat in such manner that, at the places where pressure is applied, the synthetic material fuses together and forms a cohesive non-porous plastic structure.

A shaped element with a cohesive structure of fused plastic material, is not, however, produced in accordance with the present invention but a paper-like product which does not show any such fusion. The pressure exerted is, according to the invention, effected at individual points or places which are separate from one another in such manner that at these pressure points, the fibres are certainly united with one another but there is no fusion to form a cohesive structure.

In the known proposal, such a fusion cannot be avoided if the fleece plate with a framing of dense nonporous synthetic material is subjected to an after-treatment with warm water and the like without using pressure.

Such an after-treatment involves the danger that a coalescence cannot be reliably avoided because of the comparatively high temperatures which it is necessary to employ in the absence of pressure. The product is moreover less homogeneous as a result of such an after-treatment, in that the fibres are necessarily more dense in the vicinity of the fused strips and, with a subsequent heat treatment, impervious places or broad strips are formed at these points so that the permeability of the product becomes even more irregular.

In the process according to the invention, the pressure, temperature and also duration of effect are so selected that the fibre structure is maintained in the final product, since then it is ensured that the permeability of the product does not fall below a minimum.

Instead of softening the fibre material by the action of heat, or in conjunction with this heat action, the sticking or adhesion can be assisted or produced (under the conditions of the pressure which is used) by allowing the action of solvents or swelling agents on the fibre material, for example, by carrying out the pressure treatment in an atmosphere of solvent vapour or by pretreatment of the initial fleece with swelling agents, for example, in vapour form, or even by solvents or swelling agents being left to a certain extent in the fibre; by this means, it is possible in certain circumstances to lower the temperature at which it becomes sticky (at the pressure which is used) to room temperature. The sticking action is stabilised by evaporation of the solvent or swelling agent. It is preferred to use heat during the pressure treatment in conjunction with the use of solvents or swelling agents.

The pressure treatment can be carried out in an extremely simple manner such that the starting material placed between two wire fabrics, for example, at a temperature at which a sticking of the points of contact can occur under pressure, is compressed by compressing the wire fabric, for which purpose comparatively low pressures are sufficient. After cooling, the final product of such a process is a paper-like material having good permeability, good filtering properties and chemical stability.

By suitable selection of the mesh density of the wire fabric, it is possible to effect a corresponding adjustment of the permeability of the paper-like product which is produced. The same effect can be obtained by suitable selection of the thickness of the initial layer, the thickness of the individual fibres and, to a certain degree, the amount of pressure and the temperature.

Good results are, for example, produced by using wire fabrics with a mesh size of about 200 to 400 meshes per square centimetre.

Screens can also be used in place of wire fabrics. In certain cases, it is not necessary to use wire fabrics on both sides, but the initial mixture of thermoplastic synthetic fibres may also lie on a plate or a steel sheet and be treated on only one side by means of a screen plate or a wire fabric or any other means which is suitable for exerting pressures at individual points or places which are more particularly regularly distributed.

The heating of the mixture of fibre can be effected by introducing the mixture in the form of a band into a heated chamber. It is also possible to effect the heating by applying heated plates and, especially, heated wire fabrics or gauzes under pressure, or by applying it with the wire fabric on hot surfaces, for example, rollers.

If the heating of a fleece of thermoplastic synthetic fibres lying on an unheated support is effected by pressing thereon, for example, a heated wire fabric, the desirable effect is also produced that the fibres are united with one another merely at the points or places where the pressure is exerted—corresponding to the filaments and points of intersection of the heated fabric which is pressed thereon.

It is obvious that temperatures must not be high enough to damage the material of the fibres; for example, temperature ranges from 80° to 180° C. are suitable with polyvinyl chloride fibres and fibres of after-chlorinated polyvinyl chloride.

Practically all thermoplastic synthetic materials may be used as the fibre material, for example, polyvinyl products and mixed polymers thereof, polyacryl products, polyamides and super-polyamides, and also cellulose esters and mixed esters.

The fibre length of the starting material may, for example, be 4–6 cms. or even smaller or larger.

The starting material, for example, the fleece, can be produced in the usual manner, for example, on a card.

Usually, when using only one web of starting material, it is not advantageous if all the fibres in the initial web are substantially uni-directional. In such a case, an irregular layering or a felting is advantageous.

According to the invention, it is also possible for several layers of initial fibres to be superimposed and, for sticking the fibres of two layers to one another at the places of contact, be subjected to a pressure treatment, preferably by exerting a pressure distributed over the surface at individual points or places, for example, under heat. In this manner, a particularly dense material and rigid paper-like product, for example shaped elements, can be produced.

In a preferred embodiment of the invention, the starting webs or layers, if they show a preferred direction of the fibres, are superimposed at an angle to these directions, for example, at right angles.

With this process, the starting material may also consist of layers of fibres in which the fibres are disposed substantially in one direction. By superimposition, for example at right angles to these directions, a uniform distribution of the pores and a paper-like product is produced according to the invention when sticking the points of contact of the fibres.

The paper-like product according to the invention may with advantage be subjected to a supplementary treatment, for example, for maintaining the smoothness of the surface which can become wooly or rough due to projecting ends of fibres. Such a supplementary treatment may, for example, be carried out by applying a coating layer, for example, by spraying on a plastic solution, in which case, the plastic which is applied is preferably the same as that of the fibres. By this means, the ends of the fibres are anchored in the web surface.

The product can also be subjected to a smoothing treatment for example, by calendering, for example, after a spraying treatment. By such a pressure treatment, for example, at ordinary temperature, smooth surfaces are produced and a certain compression takes place of the parts of the surface in which a sticking of the points of contact of the fibres has not taken place.

It is to be pointed out that fabrics and textures from synthetic fibres are obviously known. The product according to the invention is not concerned with such fabrics and textures, although the permeability and porosity of the paper-like product of the invention is similar to those of a fabric of fibers or filaments of thermoplastic synthetic materials, only very much greater. On the contrary, the production and the utility, respectively, of the product according to the invention is much cheaper and better and more varied than that of a fabric, since according to the invention, the operation of spinning and weaving the fibres (even if not the operation of spinning the initial filaments) is dispensed with.

It has been pointed out above that the product according to the invention is particularly suitable as filter paper in the filtering of such liquids which, like acids, attack paper fibres but not the plastic fibres. The product according to the invention may, however, also be employed for a number of other purposes, for example, in cases in which an air-pervious wrapping with a product which is comparatively resistant to moisture is required, such as is frequently of advantage, for example, with vegetables, fruit and the like.

A preferred embodiment of the process is the continuous heating and compression of a continually fed fleece for producing webs of the paper-like product.

For this purpose, it is advantageous to use two endless bands, for example, of wire fabric, which act in opposed relation and which run over a heated roller, preferably having a cooling roller arranged after it, and especially over two pairs of such rollers, so that when travelling over the heated rollers, a pressure is already exerted by the tensioning of the band on the outside, this being reinforced, for example, by providing a pressure roller.

A preferred embodiment of the invention is illustrated diagrammatically in the drawing.

The starting fleece 1, consists of a mixture of irregularly layered fibres of thermoplastic synthetic material which is guided through the apparatus by a system of wire fabric bands and rollers, so that a punctiform bonding takes place by the action of pressure to form a paper-like product 2 which leaves the apparatus in the form of a web and is guided, for example, to a take-up roller (not shown).

This apparatus comprises an endless band 3 which is led over deflecting rollers 4 and a second endless band of wire fabric 5 which is guided over reversing rollers 6.

The two bands 3 and 5 are guided so that they travel together over a heated roller 7, the fibre fleece 1 being guided between the bands. When on this heated roller 7, the fibre fleece 1 is enclosed between the two bands 3 and 5 and is thus heated on the roller. A pressure roller 8 is arranged at the end of the heating path and presses the band 5, fibre web 1 and band 3 one against the other and on to the heated roller 7. Heat is thus transmitted from the roller 7 through the band 3 to the fibre layer. The two bands 5 and 3 with the interposed fibre web 1 is then passed over a cold roller 9, then over a second heated roller 10 associated with pressure roller 11, so that the heat from the roller 10 is now supplied to the fibre layer 1 from the other side through the band 5. Thereafter, the layer 1 is cooled by passing over a cold roller 12. After leaving roller 12, the bands 5 and 3 are separated and the paper web 2 is applied to the band 3 at the reversing roller 4.

If the fleece 1 is led through a chamber or space charged with a solvent vapour before travelling on to the roller 7, then it is possible to operate with an unheated roller 7 or a pair of cold rollers 7 and 9.

What I claim is:

1. A method of manufacturing paper-like material of substantially uniform porosity from a sheet formed of loosely interlaced thermoplastic synthetic fibres, comprising the steps of first applying heat to one side of said sheet and maintaining cool the other side while simultaneously applying to the sheet a transversely directed pressure at a plurality of spaced narrowly localized points and then applying heat to the opposite side of the sheet and maintaining cool the other side thereof while again simultaneously applying to the sheet a transversely directed pressure at a plurality of spaced narrowly localized points, the said heat treatment being conducted so that the fibres juxtaposed to the pressure points coalesce while substantially maintaining fibre integrity.

2. A method of manufacturing paper-like material of substantially uniform porosity from a web formed of loosely interlaced thermoplastic synthetic fibres, comprising the steps of subjecting consecutive portions of a continuously moving web to a heat treatment first on one side and then on the other side of the web while maintaining cool the respective opposite sides and of simultaneously applying pressure to said portions at a plurality of spaced narrow spots, the said heat treatments and the said pressure treatments being so conducted that the fibres juxtaposed to the pressure spots coalesce while essentially maintaining fibre integrity.

3. A method according to claim 2 and comprising the additional step of interposing between the application of heat to opposite sides of each web portion a distance of travel of the web during which each of said web portions is cooled.

4. A method according to claim 2, wherein several webs in superposition are subjected to the aforesaid heat and pressure treatments thereby coalescing the said webs with each other.

5. A method according to claim 4, wherein several webs in each of which the fibres run predominantly in one direction are superimposed so that the predominant fibre directions cross each other.

6. A method according to claim 2 and comprising the additional step of subjecting the web to a subsequent pressure treatment conducted so as to smooth the surfaces of said web.

7. A device for manufacturing paper-like material of substantially uniform porosity from a web formed of loosely interlaced thermoplastic synthetic fibres, comprising a heatable roller, a pair of superposed webs for supporting and guiding said fibre web therebetween, said supporting and guiding webs being formed with a multitude of perforations, guide means guiding said webs over part of the circumference of said roller in close contact therewith, and pressure means coacting with said roller so as to exert a radial pressure upon one side only of portions of said webs passing between the pressure means and the roller whereby the web material of said guiding webs defining said perforations constitutes a multitude of localized pressure points acting upon the juxtaposed areas of the fibre web in contact with the heatable roller for effecting coalescence of the compressed areas while substantially maintaining fibre integrity.

8. A device according to claim 7 in combination with a cold roller, said guide means guiding said superposed webs first over the heatable roller and then over the cold roller so that one of said support and guide webs engages the heatable roller and the other the cold roller to effect alternating heating and cooling of the sides of the webs.

9. A device for manufacturing paper-like material of substantially uniform porosity from a web formed of loosely interlaced thermoplastic synthetic fibres comprising two pairs of rollers, one roller of each pair being a heatable roller and the other a cold roller, two endless webs for supporting and guiding said fibre web therebetween, at least one of said endless webs being formed with a multitude of perforations, guide means guiding said two endless webs in superposition first over the heatable roller of one pair, then over the cold roller of the said pair, thereupon over the hot roller of the other pair and finally over the cold roller of said latter pair, the said guide means and the said rollers being disposed in a spatial relationship such that opposite sides of the endless webs are successively guided over the heatable rollers and the cold rollers respectively, and a pressure means for each heatable roller, each of said pressure means coacting with the respective roller so as to exert a radial pressure upon one side only of portions of said endless webs passing between the pressure means and the respective roller whereby the marginal material of the endless webs defining the perforations therethrough constitutes a multitude of localized pressure points one sidedly acting upon the juxtaposed areas of the porous web in heat conducting contact with the respective heatable roller for effecting coalescence of the compressed areas while substantially maintaining fibre integrity.

References Cited in the file of this patent

UNITED STATES PATENTS

| | | |
|---|---|---|
| 2,218,338 | Manning | Oct. 15, 1940 |
| 2,324,838 | Harz | July 20, 1943 |
| 2,336,745 | Manning | Dec. 14, 1943 |
| 2,374,540 | Hall | Apr. 24, 1945 |
| 2,378,477 | Hanley | June 19, 1945 |
| 2,551,005 | Johnson | May 1, 1951 |

FOREIGN PATENTS

| | | |
|---|---|---|
| 120,376 | Australia | Sept. 14, 1945 |